United States Patent
Kim et al.

(10) Patent No.: US 6,646,408 B2
(45) Date of Patent: Nov. 11, 2003

(54) METHOD FOR CONTROLLING OPERATING OF SWITCHED RELUCTANCE MOTOR (SRM)

(75) Inventors: Sang Young Kim, Seoul (KR); Jun Young Lim, Incheon (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 10/013,968

(22) Filed: Dec. 13, 2001

(65) Prior Publication Data
US 2002/0175652 A1 Nov. 28, 2002

(30) Foreign Application Priority Data
May 25, 2001 (KR) ..................... 2001-0029037

(51) Int. Cl.⁷ ............................. H02P 1/46
(52) U.S. Cl. ............... 318/701; 318/715; 388/805; 388/812; 388/813
(58) Field of Search .............. 318/701, 715; 388/805, 812, 813

(56) References Cited

U.S. PATENT DOCUMENTS

| | | | | |
|---|---|---|---|---|
| 5,923,628 A | * | 7/1999 | Nogawa | 369/47.46 |
| 6,031,966 A | * | 2/2000 | Nakatani et al. | 388/805 |
| 6,101,571 A | * | 8/2000 | Barrenscheen | 710/266 |

* cited by examiner

*Primary Examiner*—Karen Masih
(74) *Attorney, Agent, or Firm*—Fleshner & Kim, LLP

(57) ABSTRACT

A method for controlling driving of a Switched Reluctance Motor (SRM) is capable of operating the SRM normally according to a phase under the normal state in case a noise is inputted to a position sensor in the SRM. In order to achieve the advantage, the method for controlling driving of a three phase SRM using a position sensor having a rate of a rotor and a stator is 6/4 or 12/8 includes the steps of generating a sensor signal according to the position of a rotor in the SRM and operating the SRM by turning on respective phases in the SRM at the point of detecting a rising edge of the sensor signal and turning off the phase at the point of detecting a falling edge of the next sensor signal.

30 Claims, 10 Drawing Sheets

SRM OF 6/4 STRUCTURE

SRM OF 12/8 STRUCTURE

METHOD FOR CONTROLLING OPERATING OF SWITCHED RELUCTANCE MOTOR (SRM)

BACKGROUND OF THE INVENTION

1. Field of the Invention

The present invention relates to a method for controlling operating of a Switched Reluctance Motor (SRM), particularly, to a method for controlling operating of a SRM to drive the SRM according to a phase under the normal condition in case a noise is inputted from the outside.

2. Description of the Background Art

FIG. 1 is a schematic view showing 6/4 and 12/8 structures of a conventional Switched Reluctance Motor (SRM) in accordance with the conventional art.

As shown in FIG. 1, a conventional SRM is composed of a SRM having 6/4 and 12/8 structures and a circuit for operating the SRM and detecting a current flowing in the respective phases applied to a winding in the SRM. Here, the circuit will be described with reference to FIG. 2 as follows.

FIG. 2 is a circuit diagram for detecting a current applied to the conventional SRM.

As shown in FIG. 2, the circuit for detecting the current applied to the SRM includes switching devices Q1 to Q6 connected to respective windings LA, LB and LC in the SRM in a row, diodes D1 to D6 connected to the respective windings LA, LB and LC in a row and resisters Rd1, Rd2 and Rd3 for sensing the current flowing in the switching devices Q2, Q4 and Q6.

On the other hand, there are two methods for detecting the noise inputted to a position sensor in the SRM. The one method is sensing a speed change of the SRM and the other method is sensing the current flowing in the SRM. Hereinafter, the two methods will be described.

First, in case of sensing the noise inputted to the position sensor in the SRM from the outside as a speed change of the SRM, the phase applied to the winding in the SRM is shifted until the SRM becomes a normal Revolutions Per Minute (RPM). At this time, the phase is shifted in the method that the B phase is turned on in case the A phase must be turned on and the C phase is turned on in case the B phase must be turned on (A phase-B phase, B phase-C phase and C phase-A phase). Namely, under the condition that the SRM is operated normally, the RPM rotates normally by exciting a magnetic phase and in case a noise is inputted, the RPM is decreased. At this time, the phase is shifted to the next phase after judging whether there is an error by sensing the RPM. Here, the process is performed repeatedly until the RPM is operated normally.

On the other hand, in case the noise is sensed by detecting the current applied to the SRM, a phase current flowing in respective phases applied to the winding in the SRM is detected. Whether the phases are excited or not is judged by comparing the detected value and the standard value. In case the magnetic phase is not excited, the SRM is operated shifting the phases one by one.

FIG. 3 is a view illustrating in case a sensor signal is correctly recognized or in case the sensor signal is incorrectly recognized when the current applied to the SRM is detected.

As shown in FIG. 3, the increased amount of current is appeared to be different according to the sensor signal outputted from the position sensor for detecting the position of the rotor in the SRM. Namely, the current values in case the sensor signal is recognized correctly and in case the sensor signal is recognized incorrectly are very different. At this time, it is judged whether the sensor signal is recognized correctly or not by comparing the current value detected in operating the SRM and the standard current value. If the sensor signal is recognized incorrectly, the SRM is operated shifting the phases one by one and the operation is repeated until the sensor signal is recognized normally.

However, in the conventional method for controlling operating of the SRM, the standard value must be determined sensing the speed of the SRM or the current flowing in the SRM to sense the input of the noise. The standard RPM or standard current value must be set in case the operation speed of the SRM is changed or the voltage applied to the SRM is changed by external circumstances. Particularly, in case the speed of the SRM must be changed according to the status of load, there occurs a problem that setting of the standard value (a standard RPM or a standard current value) is difficult.

Also, in the conventional method for controlling operating of the SRM, there occurs a problem that the SRM is stopped if inertia of load is small in case the SRM is operated shifting the phase when the noise is inputted in the SRM.

Also, in the conventional method for controlling operating of the SRM, the three current sensing resisters must be connected to the circuit for detecting the current applied to the SRM to sense the current flowing in the SRM and accordingly, a plurality of analogue/digital ports must be allotted thus to increase the load in a microcomputer (not shown).

SUMMARY OF THE INVENTION

Therefore, an object of the present invention is to provide a method for controlling operating of a Switched Reluctance Motor (SRM) capable of operating the SRM according to a phase under the normal condition in case a noise is inputted to a position sensor in the SRM from the outside.

To achieve these and other advantages and in accordance with the purpose of the present invention, as embodied and broadly described herein, there is provided a method for controlling operating of a SRM having a rate of poles of a stator and a rotor as 6/4 or 12/8, including the steps of generating a sensor signal at every mechanical angle to sense whether the respective phases applied in the SRM are commutated and operating the SRM by consequently turning on each applied phase in SRM at the point of detecting a rising edge of the sensor signal and turning off the phase at the point of detecting a falling edge of the next sensor signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a method for controlling operation of a Switched Reluctance Motor to operate the SRM normally according to a phase under the normal condition in case a noise is inputted to a position sensor in the SRM will be described with reference to FIGS. 4 to 13.

Figure 1:
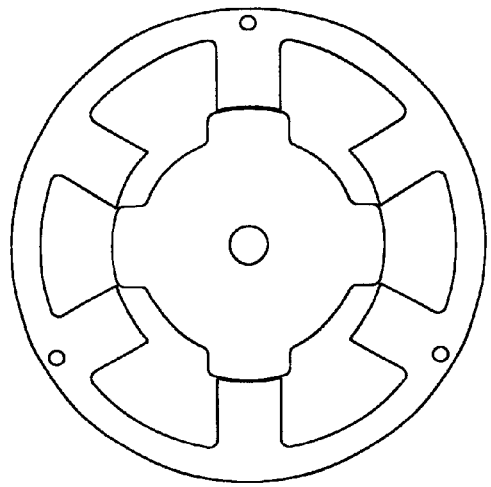
FIG. 1 is a schematic view showing 6/4 and 12/8 structures of a conventional Switched Reluctance Motor (SRM) in accordance with the conventional art.
Figure 1:
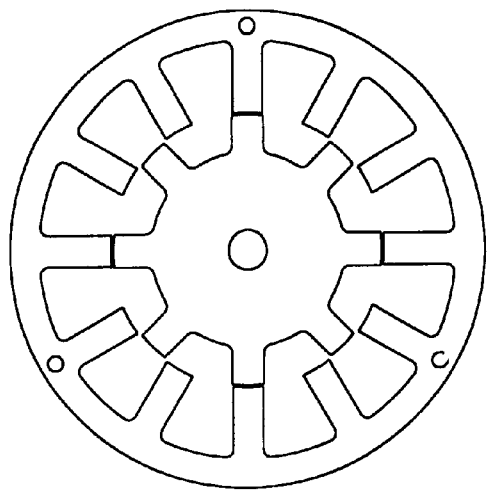
Figure 2:
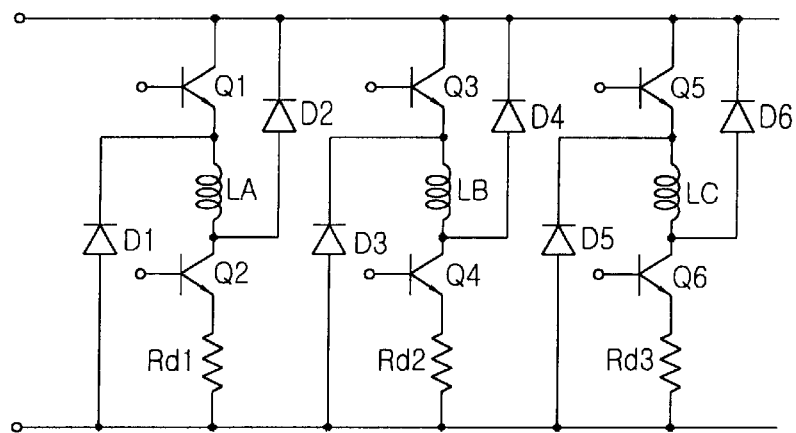
FIG. 2 is a circuit diagram for detecting a current applied to the conventional SRM.
Figure 3:
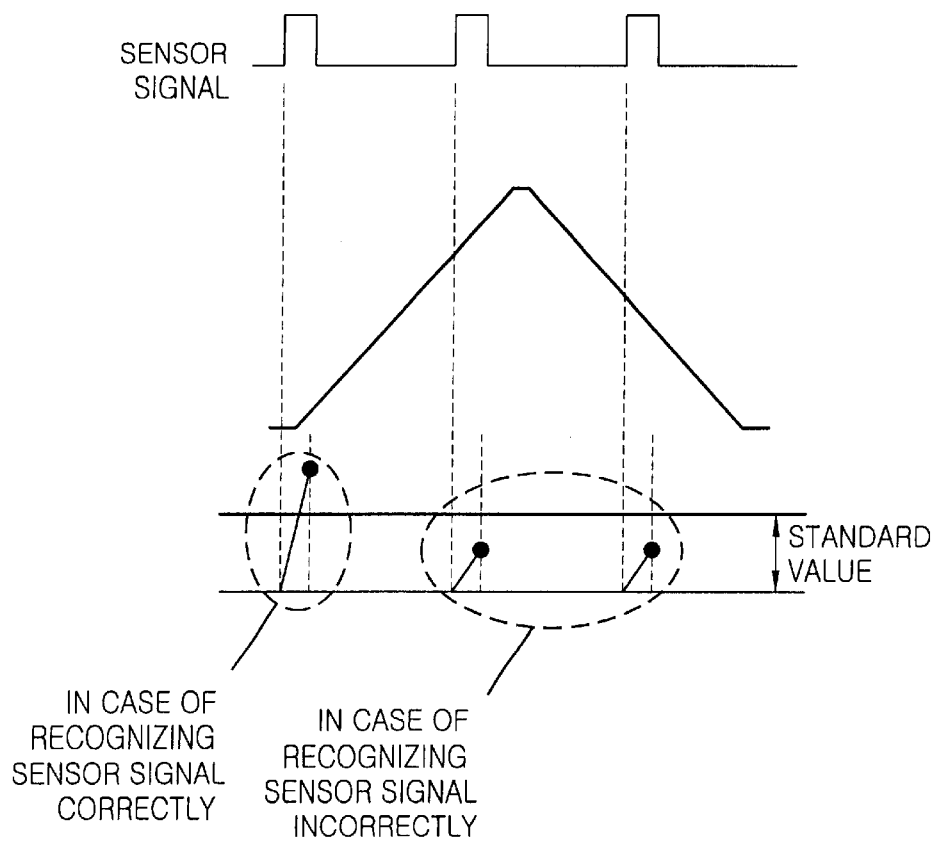
FIG. 3 is a view illustrating in case a sensor signal is correctly recognized or in case the sensor signal is incorrectly recognized when the current applied to the SRM is detected.
Figure 4:
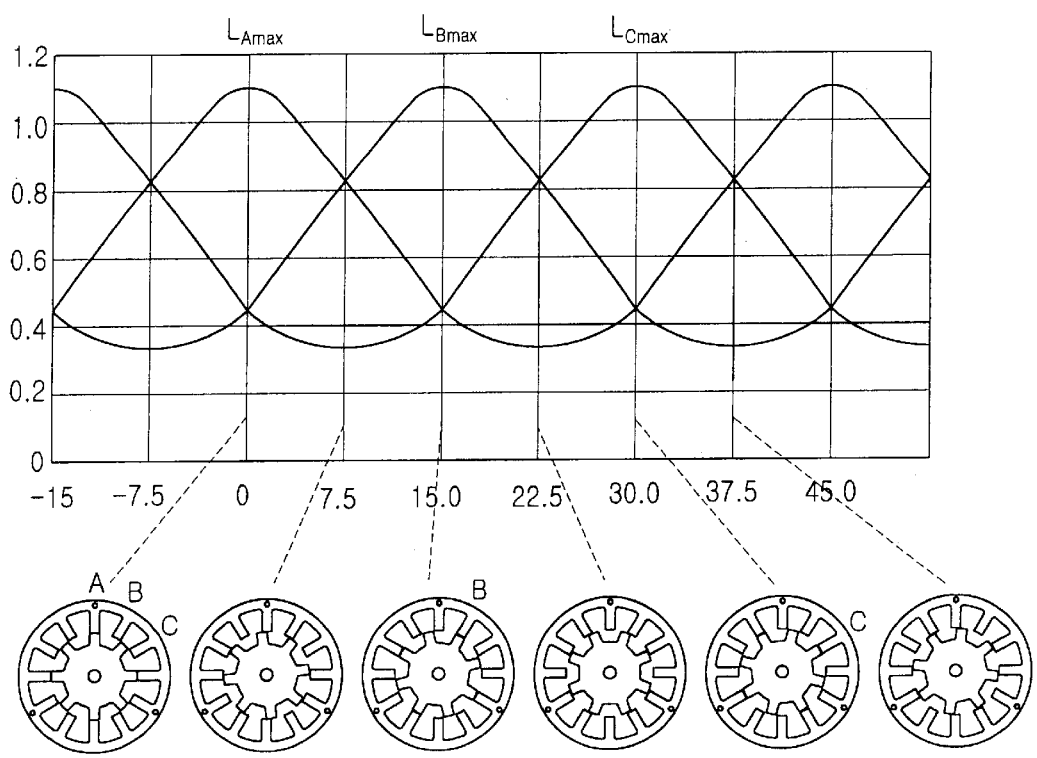
FIG. 4 is a view showing an inductance of respective phases according to the position of a rotor of the three phase SRM of 12/8 structure.

FIG. 4 is a view showing inductance of respective phases according to the position of a rotor of the three phase SRM of 12/8 structure.

As shown in FIG. 4, an inductance for phases applied to a winding in the SRM is determined by the relative position of a stator and a rotor in the SRM. At this time, since the voltage equation in case the SRM is under the condition of being stopped is V=Ldi/dt, a current flowing in each phase applied to the winding in the SRM is expressed as follows.

$$I = \int V/L \, dt \qquad \text{formula 1}$$

Here, the above V is voltage applied to the phase, the I is the current flowing in the winding when the voltage is applied and L is the inductance determined in the relative position of the rotor and stator in the SRM.

Figure 5:
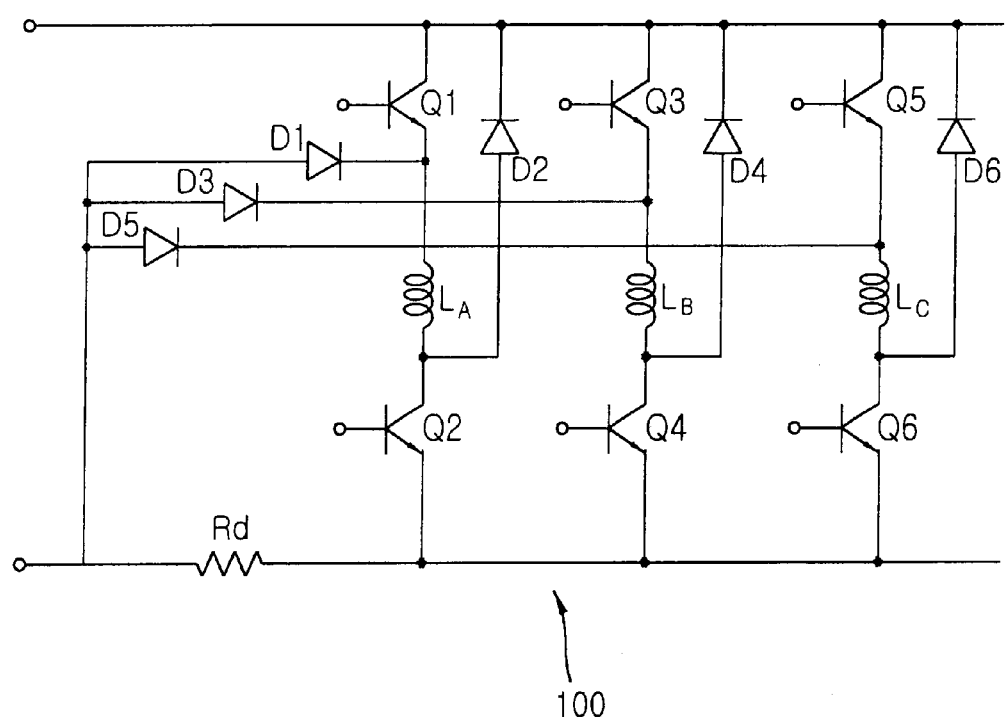
FIG. 5 is a circuit diagram for detecting a current applied to a SRM in accordance with the present invention.

FIG. 5 is a circuit diagram for detecting a current applied to a SRM in accordance with the present invention.

As shown in FIG. 5, the circuit 100 for detecting the current applied to the SRM includes first switching devices Q1, Q3 and Q5 connected at one side of the respective windings LA, LB and LC in the SRM in a row, second switching devices Q2, Q4 and Q6 connected at the other side of the respective windings LA, LB and LC in a row, first diodes (terminals of the first diodes) D2, D4 and D6 connected between the other side of the respective windings LA, LB and LC and the second switching devices D2, D4 and D6 in a row, second diodes (+terminals of the second diodes) D1, D3 and D5 connected between one of the respective windings LA, LB and LC and the first switching devices D1, D3 and D5 in a row and resistors connected to emitter groups of the second switching devices and –terminals of the diodes D1, D3 and D5 to detect the three phase current applied to the respective windings in the SRM. Here, a power source is connected to the collector devices of the transistor Q1 the –terminals of the diodes D1, D3 and D5. Namely, the three phase SRM (not shown) having 6/4 and 12/8 structures, a circuit 100 for driving the three phase SRM and sensing current flowing in the respective phases, a sensor disk (not shown) for generating high and low signals of a sensor for sensing the position of the rotor and the sensor signal and an overlap driving algorithm for applying the phase signal to the respective windings in the SRM on the basis of the signal of the sensor. Namely, in case a sensor is used to sense the position of the rotor in the SRM, the sensor signal outputted from the position sensor must be stored. When the basic position of the rotor in the SRM is stored and at the same time, the sensor signal is inputted from the position sensor, the SRM is driven by shifting the phase applied to the winding in the SRM one by one.

If a noise is inputted to the position sensor in the SRM in driving the SRM, the SRM operates abnormally by the shifted phase. Therefore, the SRM is operated normally using the position of the sensor signal, angle of the sensor signal and the overlap driving algorithm regardless of the noise inputted to the position sensor.

Hereinafter, the method for driving the SRM normally will be described with reference to an embodiment of a three phase SRM of 12/8 structure where the number of poles is 12 and the number of poles is 8.

First, when the SRM with the 12/8 structure rotates the rotor, the phase must commutated twenty fourth times (eight times per each phase). Namely, the phases must be commutated at every fifteen degrees in a mechanical angle. Here, a sensor signal outputted from the position sensor is generated at every fifteen degrees in a mechanical angle in case a position sensor is used to detect the position of the rotor in the SRM. Namely, high and low sensor signals are all standard signals in the present invention. it will be described in detail with reference to FIG. 6.

Figure 6:
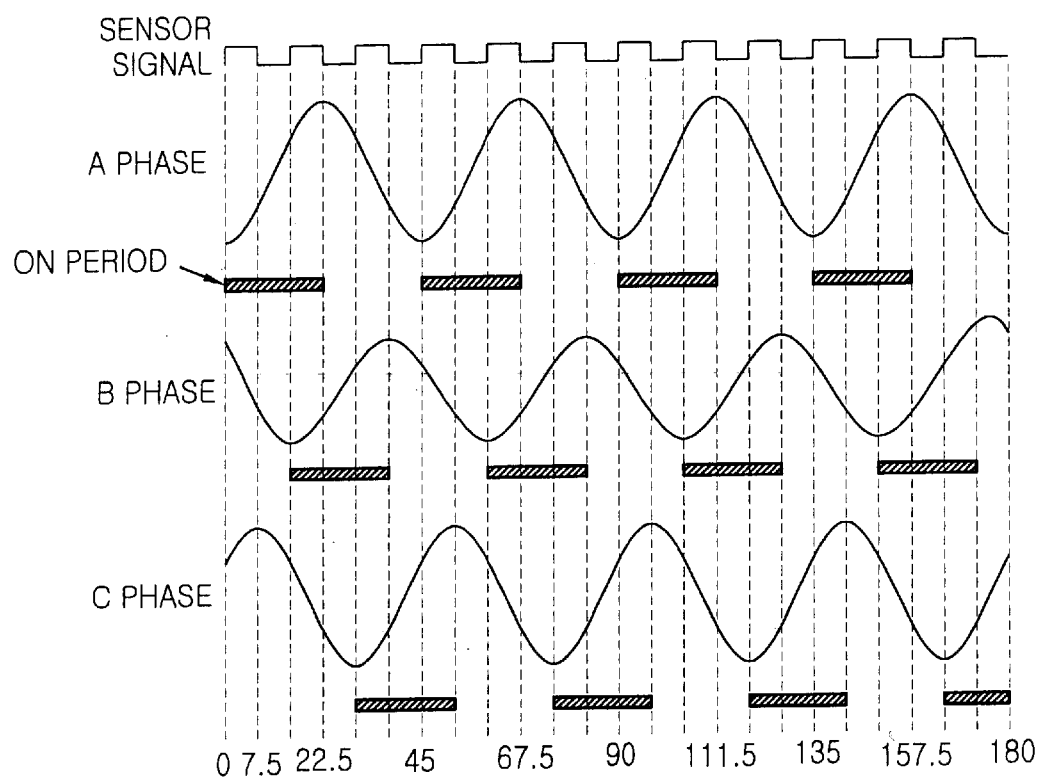
FIG. 6 is a view illustrating an inductance profile in case a method for controlling operating of the SRM and a period where phases applied to a winding in the SRM is on in accordance with the present invention.

FIG. 6 is a view illustrating an inductance profile in case a method for controlling operating of the SRM and a period where phases applied to a winding in the SRM is on in accordance with the present invention. FIG. 6 will be described with reference to FIG. 7.

Figure 7:
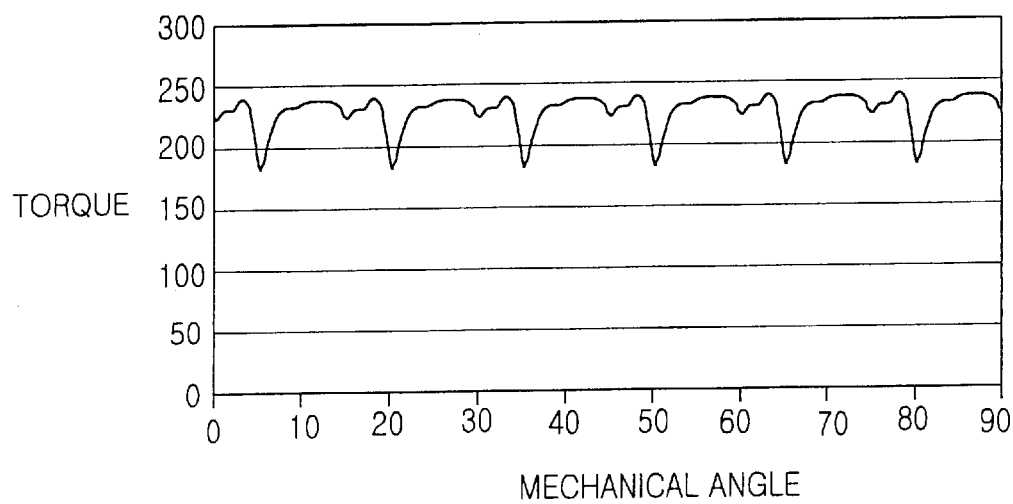
FIG. 7 is a view showing a torque curve in case the current is applied in the period where the phases are on in FIG. 6.

FIG. 7 is a view showing a torque curve in case the current is applied in the period where the phases are on in FIG. 6.

As shown in FIG. 6, the method for controlling operating of the SRM in accordance with the present invention generates the sensor signal at the position of the rotor in the SRM (or at every mechanical angle) to sense the commutation of the phase applied to the SRM and the SRM can be operated normally even if a noise is inputted to the position sensor by turning on the respective phases at the point of detecting a rising edge of the sensor signal and turning off at the point of detecting a falling edge of the sensor signal. The method of the present invention will be described as follows.

First, the high signal is generated at the position where the inductance is lowest and then after 7.5°, a low signal is generated. Then the sensor signal outputted from the position sensor is generated at every 15°. Here, since the phases applied to the winding in the SRM are on from the point of the high signal of the sensor signal recognized in the period where the inductance is lowest to the point of the detection of the low signal of the next sensor signal, the two phases are on in the period where the sensor signal is high and just one signal is on in the period where the sensor signal is low. Also, whenever the sensor signal is generated as a high signal, the phase which is on operates the SRM being shifted in the order of A phase→B phase→C phase→A phase. Namely, the phase is on at the point of detecting the high signal of the sensor signal and the phase is off at the point of detecting the low signal of the sensor signal. When the sensor signal is high, the phase is shifted. For example, just one phase is turned on for 22.5° and is overlapped with the previous phase or the next phase for 7.5° thus to operate the SRM. If a current is generated only in the period where the phase is on, the torque curve is expressed as FIG. 7.

Figure 8:
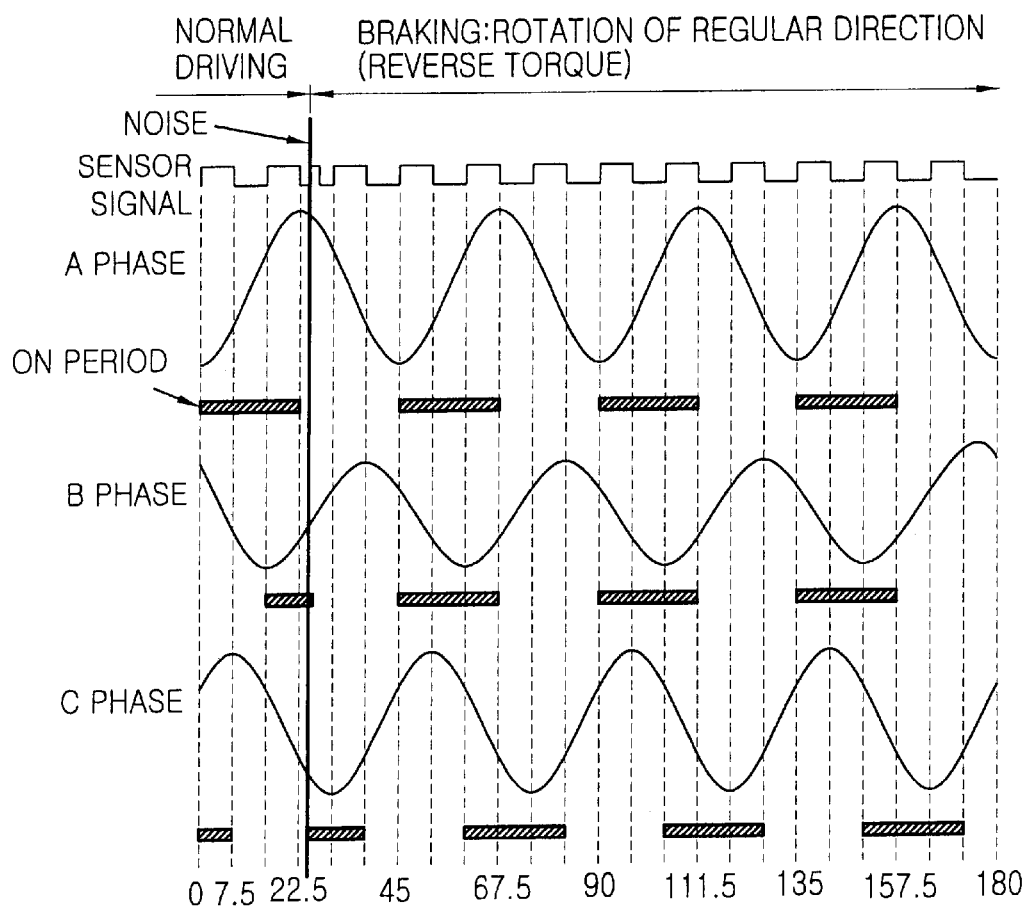
FIG. 8 is a view showing a graph where the phases are pulled one phase ahead in case a noise is generated in the sensor signal in operating the SRM normally.

FIG. 8 is a view showing a graph where the phases are pulled one phase ahead in case a noise is generated in the sensor signal in operating the SRM normally. It will be described with reference to FIG. 9.

Figure 9:
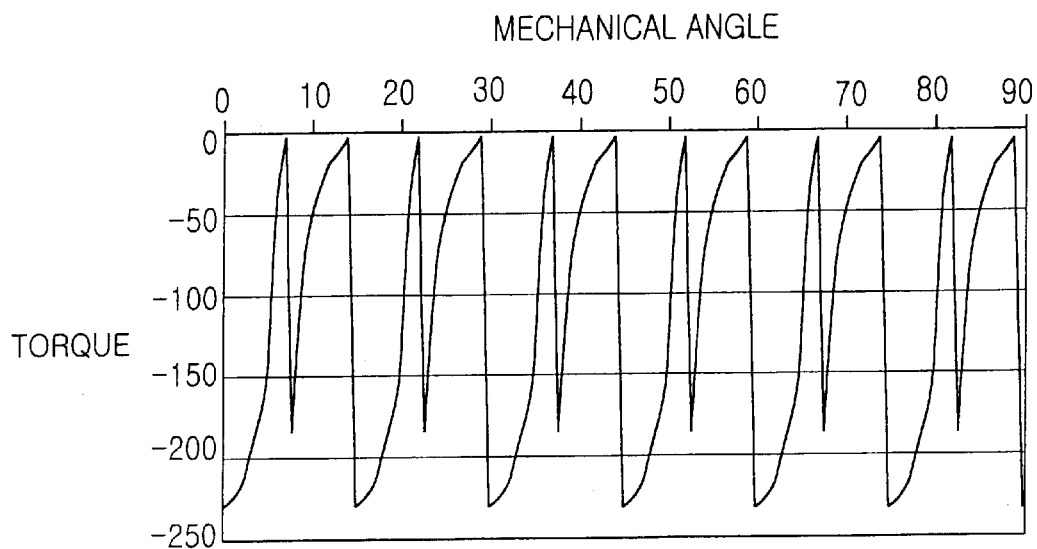
FIG. 9 is a view showing a torque curve when a noise is generated in the sensor signal.

FIG. 9 is a view showing the torque curve when the noise is generated in the sensor signal.

As shown in FIG. 8, since when the noise is inputted (generated) in the sensor signal the phase is moved up one by one, torques opposed to the preferred rotating direction (regular direction) are generated as shown in FIG. 9. Namely, since the torque (reverse torque) is generated in the reverse direction of the regular direction, the number of the rotor in the SRM is decreased and the rotor rotates in the opposed direction of the regular direction at a certain point.

Figure 10A:
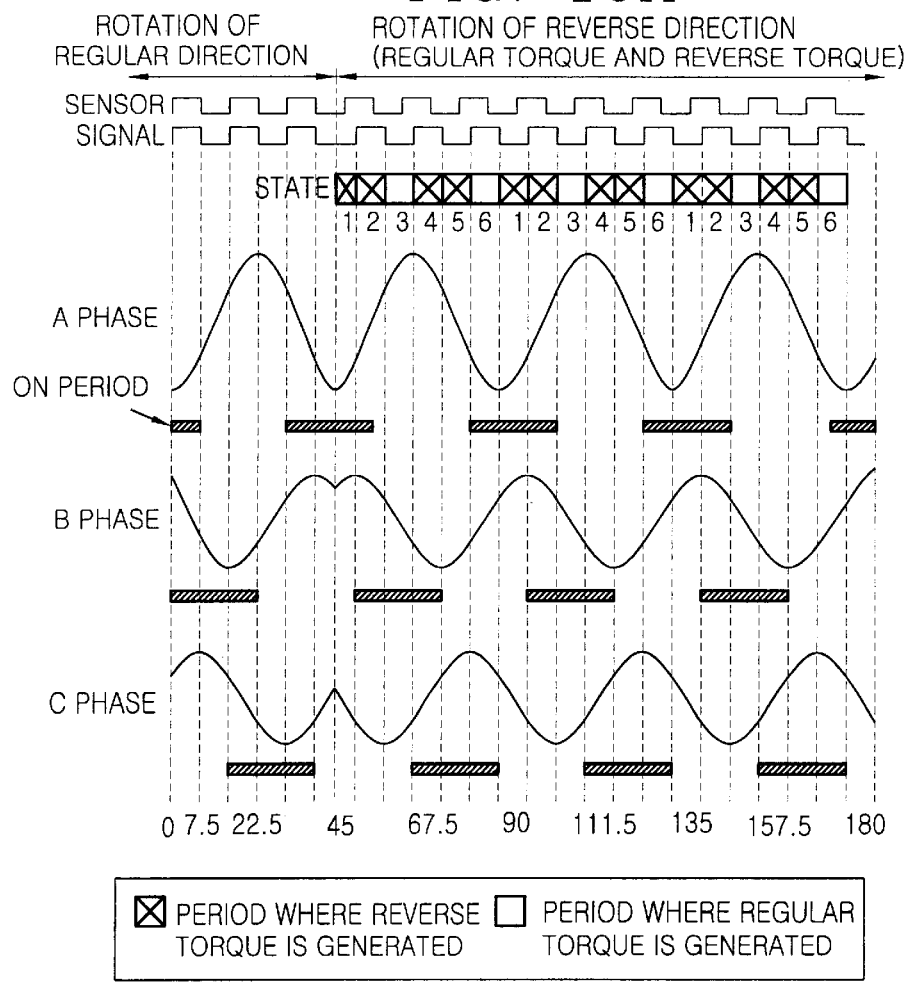
FIGS. 10A and 10B are views showing a reverse torque generation period, regular torque generation period and the torque curves thereof.
Figure 10B:
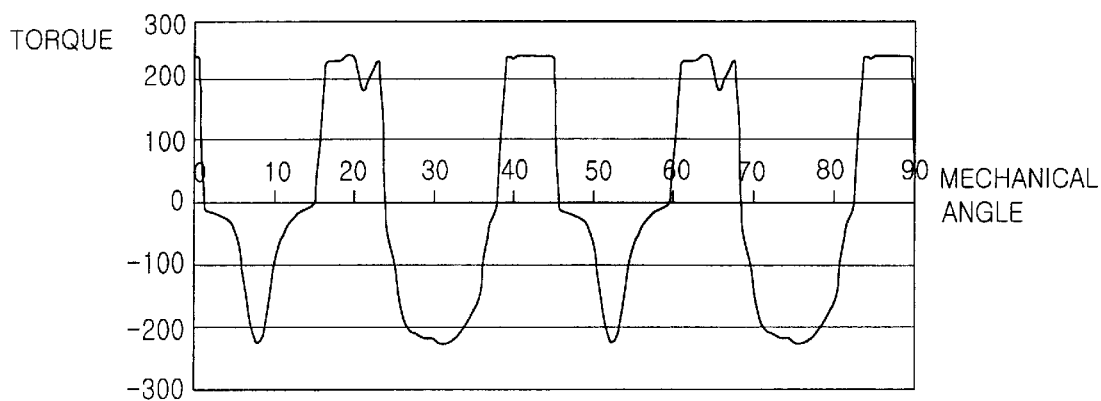

FIGS. 10A and 10B are views showing a reverse torque generation period, regular torque generation period and the torque curves thereof. Namely, FIGS. 10A and 10B are views illustrating the status when the regular and reverse torques are generated as the rotor in the SRM rotates in the reverse direction when the noise is inputted to the position sensor and the speed of the SRM is declined by the reverse torque gradually.

As shown in FIGS. 10A and 10B, the inductance profile and the sensor signal are symmetrical with each other to the point. Namely, as the sensor signal is generated, regular torques and reverse torques are generated thus to classify the state to six states and the six states are repeated continuously. At this time, the regular torque is generated at two states among the six states as the rotor is rotated in the reverse direction and the reverse torques are generated at the odd four states. Here, the rotor is rotated in the reverse direction at the reverse torques. However, if the rotor is rotated in the regular direction at the regular torque, the SRM is operated in the normal state according to the normal phase again.

Hereinafter, the state when the SRM is operated normally by receiving the normal torque where the state is 3 or 6 will be described with reference to FIGS. 11 and 12.

Figure 11:
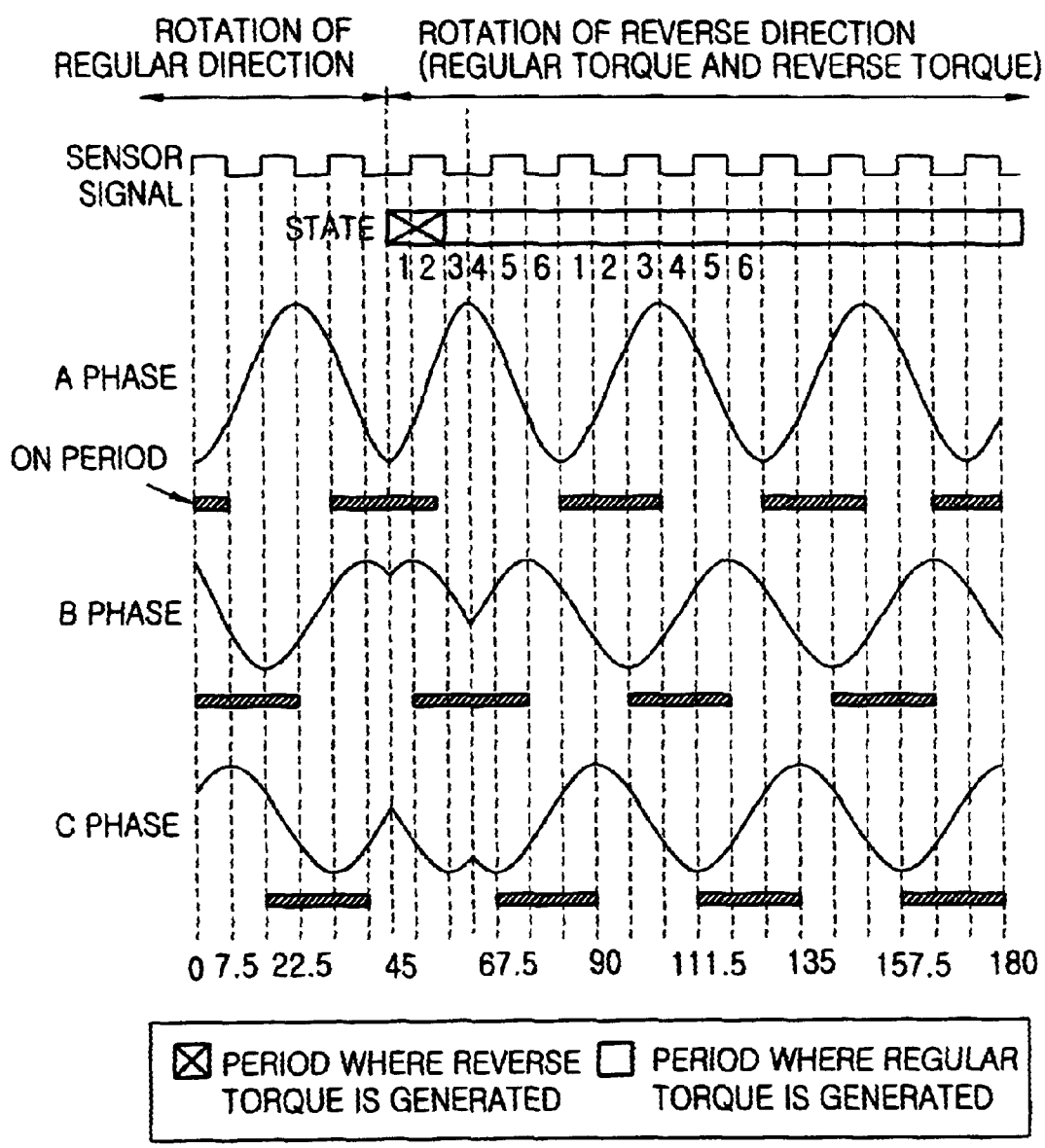
FIG. 11 is a view showing a normal rotation of the SRM by receiving the regular torque in the period where the state is 3.

FIG. 11 is a view showing a normal rotation of the SRM by receiving the regular torque in the period where the state is 3.

As shown in FIG. 11, if the rotor is rotated in the regular direction by receiving the regular torque in the period where the state is 3, the sensor signal and the inductance profile are symmetric with each other specially again to the point if the rotor rotates in the regular direction. Therefore, the SRM is operated normally.

Figure 12:
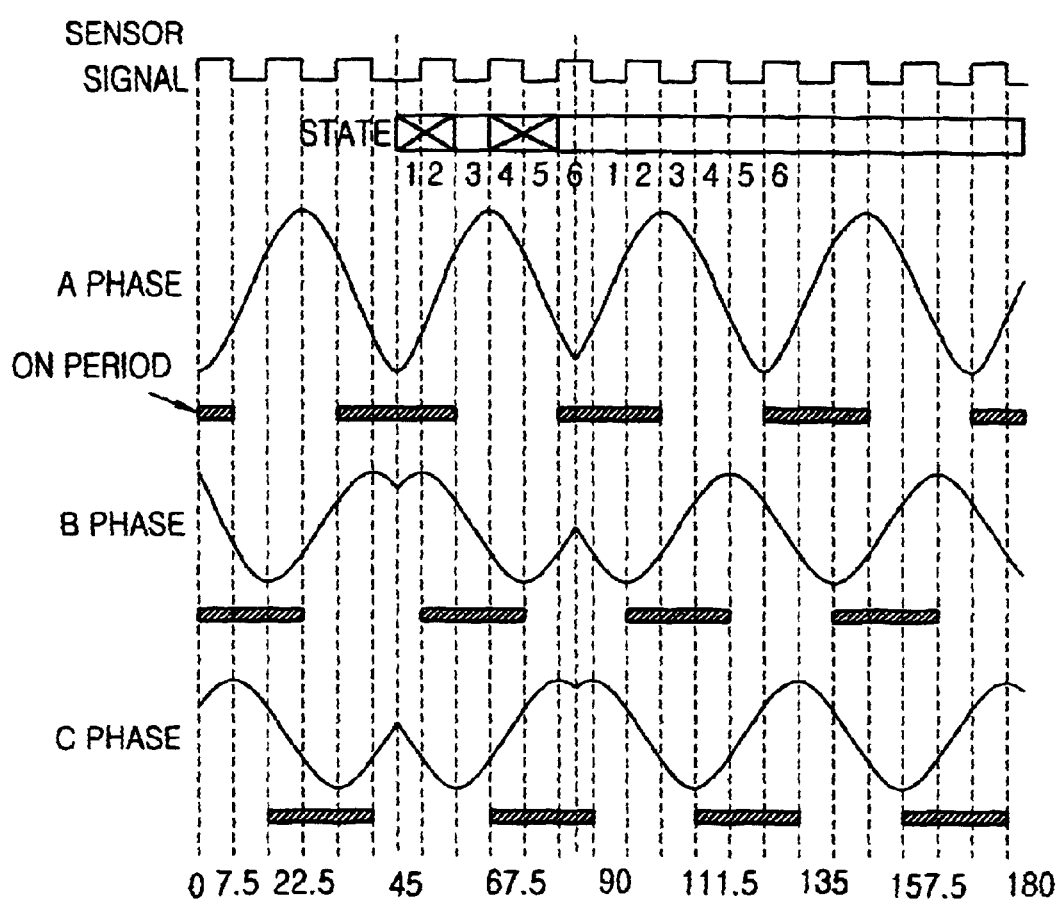
FIG. 12 is a view showing the normal rotation of the SRM by receiving the regular torque in the period where the state is 6.

FIG. 12 is a view showing the normal rotation of the SRM by receiving the regular torque in the period where the state is 6.

As shown in FIG. 12, if the rotor is rotated in the regular direction by receiving the regular torque in the period where the state is 6, the sensor signal and the inductance profile are symmetric with each other specially again to the point if the rotor rotates in the regular direction. Therefore, the SRM is operated normally.

On the other hand, in case a voltage is applied to each phase applied to the winding in the SRM, if the phase is turned off after applying the voltage while the phase is on, a residual current is remained and affects. By taking this state into consideration, in case the rate of the rotor and stator in the SRM is 12/8, the point of turning on of the each phase is set as the point 0 to 1° of a mechanical angle ahead and the point of turning off of the each phase is set as the point 0 to 2° of a mechanical angle ahead. This will be described with reference to FIGS. 13A and 13B.

Figure 13A:
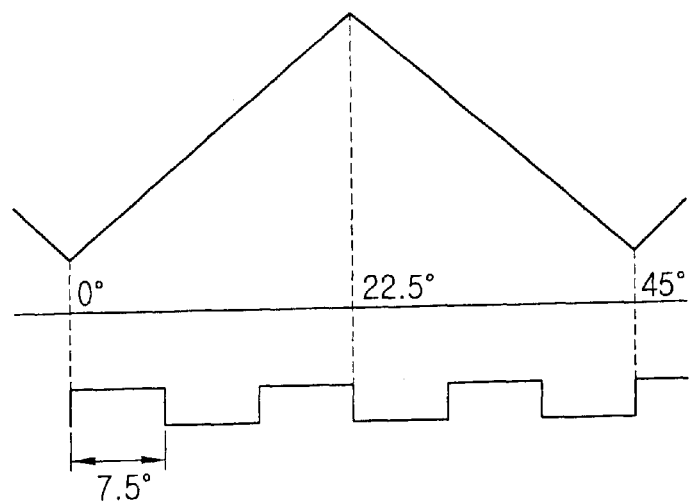
FIGS. 13A and 13B are views showing the position of the sensor signal when a voltage is applied to the respective phases.
Figure 13B:
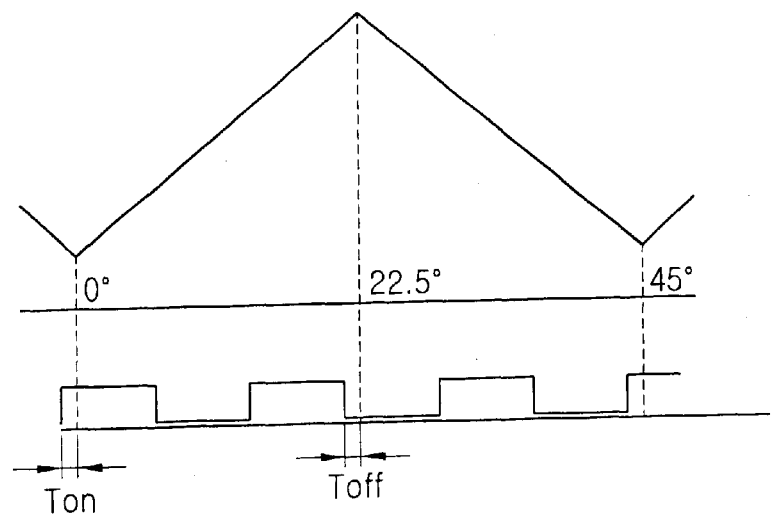

FIGS. 13A and 13B are views showing the position of the sensor signal when a voltage is applied to the respective phases. As shown in FIGS. 13A and 13B, in case the rate of the rotor and stator in the SRM is 6/4, the point of turning on (Ton) of the each phase is set as the point 0 to of a mechanical angle ahead and the point of turning off (Toff) of the each phase is set as the point 0 to 4° of a mechanical angle ahead on the basis of FIG. 13A. Namely, the SRM is operated by turning on respective phases in the SRM at the point 0 to 2° of the mechanical angle ahead of a minimum point of the inductance and turning off the phase at the point 0 to 4° of the mechanical angle ahead of a maximum point of the inductance.

Also, the point of detecting of high signal of the sensor signal is set as the point 0 to 1° of a mechanical angle ahead and the point of detecting of low signal of the sensor signal is set as the point 0 to 2° of a mechanical angle ahead in the SRM of 12/8 structure, in case it is needed to adjust the on period of each phase to control the speed of the SRM precisely and decrease the noise in the SRM thus to control the on period of the preferred phase on the basis of the rising and falling signals of the sensor signal. Namely, the SRM is operated by turning on respective phases in the SRM at the point 0 to 1° of the mechanical angle ahead of a minimum point of the inductance and turning off the phase at the point 0 to 2° of the mechanical angle ahead of a maximum point of the inductance. At this time, in case the SRM declines lower than the Revolutions Per Minute (RPM) by the noise inputted to the position sensor, the operation of the SRM is controlled by adapting the overlap driving algorithm. On the other hand, in case the SRM is higher than the standard RPM, the operation of the SRM is controlled in the method as the user wants on the basis of the position of the predetermined sensor signal.

As described above in detail, the method for controlling driving of the SRM in accordance with the present invention can operate the SRM according to the normal phase without sensing peculiar abnormal states in case the noise is inputted to the position sensor in the SRM.

Also, the method for controlling driving of the SRM in accordance with the present invention is applied only in case the speed of the SRM is lower than the standard RPM by setting the position of the sensor signal and the overlap driving algorithm and the method preferable for the user on the basis of the position of the predetermined sensor signal is applied in case the speed of the SRM is higher than the standard RPM to control the operation of the SRM.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for controlling operation of a Switched Reluctance Motor (SRM), comprising:
   generating a sensor signal according to a position of a rotor in the SRM;
   applying the signal to the SRM based on an overlap driving algorithm; and
   operating the SRM by turning on respective phases in the SRM at the point of detecting a rising edge of the sensor signal and turning off the phase at the point of detecting a falling edge of the next sensor signal.

2. The method of claim 1, wherein the respective phases applied in the SRM are sequentially turned on/off.

3. The method of claim 1, wherein the sensor signal is generated to sense whether the respective phases are commutated.

4. The method of claim 1, further comprising:
   operating the SRM by turning on respective phases in the SRM at a minimum point of an inductance and turning off the phase at a maximum point of the inductance.

5. The method of claim 1, wherein the step of operating the SRM is performed if speed of the SRM is lower than a standard RPM (Revolutions Per Minute) due to generation of a noise in the sensor signal.

6. The method of claim 1, wherein the sensor signal is generated at every mechanical angle.

7. The method of claim 6, wherein the mechanical angle is 15°.

8. The method of claim 6, wherein the overlap driving algorithm is based on operating the SRM by turning on respective phases in the SRM at the point 0 to 1° of the mechanical angle and turning off the phase at the point 0 to 2° of the mechanical angle.

9. The method of claim 6, wherein the overlap driving algorithm is based on operating the SRM by turning on respective phases in the SRM at the point 0 to 2° of the mechanical angle and turning off the phase at the point 0 to 4° of the mechanical angle.

10. The method of claim 1, wherein the overlap driving algorithm works in conjunction with the sensor signal angle and position to maintain normal operation of the SRM.

11. The method of claim 1, wherein the SRM is a three phase SRM.

12. A method for controlling operation of a three phase Switched Reluctance Motor (SRMT), comprising:
   generating a sensor signal according to a position of a rotor in the SRM, wherein the ratio of poles of a stator to poles of a rotor in the SRM is 12/8;
   applying the signal to the SRM based on an overlap driving algorithm; and
   operating the SRM by sequentially turning on each of the three applied phases in the SRM at the point of detecting a rising edge of the sensor signal and turning off each phase at the point of detecting a falling edge of the next sensor signal.

13. The method of claim 12, further comprising:
   operating the SRM by turning on respective phases in the SRM at the minimum point of an inductance and turning off the phase at the maximum point of the inductance.

14. The method of claim 12, wherein the step of operating the SRM is performed if speed of the SRM is lower than a standard RPM (Revolutions Per Minute) due to generation of a noise in the sensor signal.

15. The method of claim 12, wherein the sensor signal is generated at every mechanical angle.

16. The method of claim 15, wherein the overlap driving algorithm operates the SRM by turning on respective phases in the SRM at the point 0 to 1° of the mechanical angle ahead of a minimum point of an inductance and turning off the phase at the point 0 to 2° of the mechanical angle ahead of a minimum point of the inductance.

17. The method of claim 12, wherein the overlap driving algorithm works in conjunction with the sensor signal angle and position to maintain normal operation of the SRM.

18. A method for controlling operation of a three phase Switched Reluctance Motor (SRM), comprising:
   generating a sensor according to a position of a rotor in the SRM, wherein the ratio of poles of a stator to poles of the rotor is 6/4;
   sensing the commutation of the respective phases;
   applying the signal to the SRM based on an overlap driving algorithm; and
   operating the SRM by sequentially turning on each applied phase in SRM at the point of detecting a rising edge of the sensor signal and turning off the phase at the point of detecting a falling edge of the next sensor signal.

19. The method of claim 18, further comprising:
   operating the SRM by turning on respective phases in the SRM at a minimum point of an inductance and turning off the phase at a maximum point of the inductance.

20. The method of claim 18, wherein the step of operating the SRM is performed if speed of the SRM is lower than a standard RPM (Revolutions Per Minute) due to generation of a noise in the sensor signal.

21. The method of claim 18, wherein the sensor signal is generated at every mechanical angle.

22. The method of claim 21, wherein the overlap driving algorithm operates the SRM by turning on respective phases in the SRM at the point 0 to 2° of the mechanical angle ahead of a minimum point of an inductance and turning off the phase at the point 0 to 4° of the mechanical angle ahead of a maximum point of the inductance.

23. The method of claim 18, wherein the overlap driving algorithm works in conjunction with the sensor signal angle and position to maintain normal operation of the SRM.

24. A method for controlling operation of a Switched Reluctance Motor (SRM), comprising:
   operating the motor in a first operational state in which a rotor of the motor generates at least one of a regular torque and a reverse torque;
   transitioning the motor from the first operational state into a second operational state in which the rotor of the motor generates at least one of a regular torque and a reverse torque;
   transitioning the motor from the second operational state into a third operational state in which the rotor of the motor generates at least a regular torque; and
   operating the SRM in the third operational state based on an overlap driving algorithm.

25. The method of claim 24, wherein control of the SRM reverts to the overlap driving algorithm if a rotational speed of the SRM falls below a predetermined value for rotational speed.

26. The method of claim 24, wherein the SRM generates sequential sensor signals according to a position of the rotor, and the SRM is operated by turning on respective phases in the SRM at the point of detecting a rising edge of a sensor signal and turning off the phase at the point of detecting a falling edge of the next sensor signal.

27. The method of claim 26, wherein the sensor signals are generated at every mechanical angle.

28. The method of claim 27, wherein the overlap driving algorithm is configured to operate the SRM by turning on respective phases in the SRM at the point 0 to 1 degree of the mechanical angle and turning off the phase at the point 0 to 2 degrees of the mechanical angle.

29. The method of claim 27, wherein the overlap driving algorithm is configured to operate the SRM by turning on respective phases in the SRM at the point 0 to 2 degrees of the mechanical angle and turning off the phase at the point 0 to 4 degrees of the mechanical angle.

30. The method of claim 24, further comprising:

transitioning the motor from the third operational state into a fourth operational state in which the rotor of the motor generates at least one of a regular torque and a reverse torque;

transitioning the motor from the fourth operational state into a fifth operational state in which the rotor of the motor generates at least one of a regular torque and a reverse torque;

transitioning the motor from the fifth operational state into a sixth operational state in which the rotor of the motor generates at least a regular torque; and operating the SRM in the sixth operational state based on the overlap driving algorithm.

* * * * *